United States Patent [19]

Jackson

[11] Patent Number: 4,821,767

[45] Date of Patent: Apr. 18, 1989

[54] PRESSURE REGULATOR

[76] Inventor: Peter J. Jackson, 3 Queensmead, Franklyn Road, Durrington, Worthing, West Sussex BN13 2PG, England

[21] Appl. No.: 166,434

[22] Filed: Mar. 10, 1988

Related U.S. Application Data

[63] Continuation of Ser. No. 44,338, Apr. 30, 1987, abandoned.

[30] Foreign Application Priority Data

May 7, 1986 [GB] United Kingdom ................. 8611113
Dec. 5, 1986 [GB] United Kingdom ................. 8629099

[51] Int. Cl.[4] ............................................... G05D 6/06

[52] U.S. Cl. ............................... 137/491; 128/204.26; 137/505.38

[58] Field of Search ........................... 137/491, 505.38; 128/204.26, 205.24

[56] References Cited

U.S. PATENT DOCUMENTS

| | | | |
|---|---|---|---|
| 3,285,261 | 11/1966 | Chaney | 137/491 X |
| 3,752,175 | 8/1973 | Hamilton | 137/491 X |
| 3,900,045 | 8/1975 | Murrell | 137/505.38 |
| 4,334,532 | 6/1982 | Jackson | 137/491 X |
| 4,454,893 | 6/1984 | Orchard | 137/494 |
| 4,630,641 | 12/1986 | Lacour | 137/505.38 |
| 4,667,670 | 5/1987 | Feathers | 137/491 X |

FOREIGN PATENT DOCUMENTS

| | | |
|---|---|---|
| 693244 | 6/1953 | United Kingdom . |
| 2075848 | 11/1981 | United Kingdom . |
| 2116852 | 10/1983 | United Kingdom . |

*Primary Examiner*—Robert G. Nilson
*Attorney, Agent, or Firm*—Lon H. Romanski

[57] ABSTRACT

A pressure regulator comprises a housing (1) defining first and second chambers separated by a movable partition (4,5), the first chamber being provided with an inlet port (2) facing towards and sealingly closeable by a rigid central portion (5) of the partition at a position remote from its centroid and an outlet port (3), and the second chamber being vented (7) to a reference pressure, the regulator including means (8) extending between the housing and the central portion (5) of the partition to define a pivot axis for the partition extending between its centroid and the position of the inlet port (2). The partition (4,5) may be a tilting diaphragm or a piston (D) with a peripheral sealing element (S). The pivot axis for the partition may be defined by a fixed pivot pin (20), or by projections (8) extending across the first chamber to abut the partition (4,5). A two-stage device is also described in which the tilting partition (35) controls a pilot jet (32) which in turn controls a valve member (43) adapted to permit or deny access from a supply port (44) to an outlet port (33).

9 Claims, 3 Drawing Sheets

PRESSURE REGULATOR

This is a continuation of application Ser. No. 44,338, filed Apr. 30, 1987, now abandoned.

This invention relates to pressure regulators, and is particularly concerned with demand valves for breathing apparatus, whereby breathable gas is supplied automatically to a facepiece or mask in accordance with the wearer's respiratory requirements. Most particularly, the present invention relates to demand valves of the positive pressure type which continually maintain a pressure slightly greater than that of the surrounding atmosphere within a facepiece or helmet, so as to prevent inward leakage.

In such demand valves, flow of gas to the wearer is controlled by movement of a sensitive diaphragm having one face exposed to atmospheric pressure, and the other face to pressure within the facepiece.

In practice, very small changes in pressure across the diaphragm, of the order of 1 millibar or less, may be required to regulated the flow of gas entering the valve at a supply pressure of typically 7 bar or greater, and in order to gain the necessary mechanical advantage, known valves generally employ various lever and spring arrangements. Alternatively, valves of the Pilot or two-stage type are sometimes used, wherein the mechanical advantage is obtained by gas pressures, However, such valves still generally employ pivoted levers as a means of transmitting diaphragm movement to the valve, often because the direction of diaphragm movement is inconvenient and has to be reversed.

In known demand valves, the positive pressure is usually established by biasing the diaphragm with a spring.

The reliability of breathing apparatus is of the upmost importance, and to this end it is desirable for its construction to be very simple.

According to a first aspect of the present invention, a pressure regulator comprises a housing defining first and second chambers separated by a movable partition, the first chamber being provided with an inlet port facing towards, and sealingly closeable by, a rigid central portion of the partition at a position remote from its centroid and an outlet port, and the second chamber being vented to a reference pressure, and the regulator including means extending between the housing and the central portion of the partition to define a pivot axis for the diaphragm extending between its centroid and the position of the inlet port.

The partition may comprise a diaphragm having a rigid central portion and a flexible peripheral portion sealingly secured to isolate the first and second chambers, or may comprise a piston having a rigid central disc and a peripheral sealing element capable of sealing against the inner surface of the housing as the piston is tilted.

In a first embodiment of the invention, the means defining the fulcrum comprises one or more projections contacting the central portion of the diaphragm on its side remote from the inlet port. Two projections may be provided, one on either side of a line joining the inlet port to the centroid of the central portion of the diaphragm. Most preferably, the diaphragm is circular and the rigid central portion is formed by a rigid circular backing plate fixed concentrically to the diaphragm on its side remote from the inlet port.

In a second embodiment of the present invention, the central portion of the diaphragm is attached to the housing via a hinged joint defining a pivot axis for the diaphragm, the pivot axis extending between the centroid of the rigid portion of the diaphragm and the inlet port.

The hinged joint may comprise one or more pillars or brackets extending from the housing toward the diaphragm and joined by a pivot pin to a bracket or brackets mounted on the diaphragm.

A second aspect of the invention utilises the valving device described above as a pilot valve, to operate a pressure regulator of reduced overall proportions. In accordance with this second aspect of the invention, a pressure regulator comprises a housing defining first and second chambers separated by a movable partition, the first chamber being vented to the surroundings and the housing including fulcrum means to define an eccentric pivot axis for a rigid central part of the partition, the second chamber including a pilot jet facing the partition and closeable thereby at a position on the side of the pivot axis remote from the centroid of the rigid portion of the partition, and a vent to the outlet of the pressure regulator, the housing further defining a third chamber communicating with the pilot jet and partially defined by a valve member adapted to deny access from a high pressure supply port to the outlet port of the demand valve, high pressure being supplied to the third chamber via an orifice, such that while a predetermined back pressure is applied to the outlet, the rigid portion of the partition is held in a position to close the pilot jet and the valve member is held in its closed position by the high pressure supplied to the third chamber via the orifice, and that when the back pressure is removed the pilot jet is opened, the pressure in the third chamber reduces and the valve member moves to permit access from the supply port to the outlet.

Exemplary embodiments of the invention illustrating each of its aspects, will now be described in detail with reference to the accompanying drawings, in which.

Figure 1:
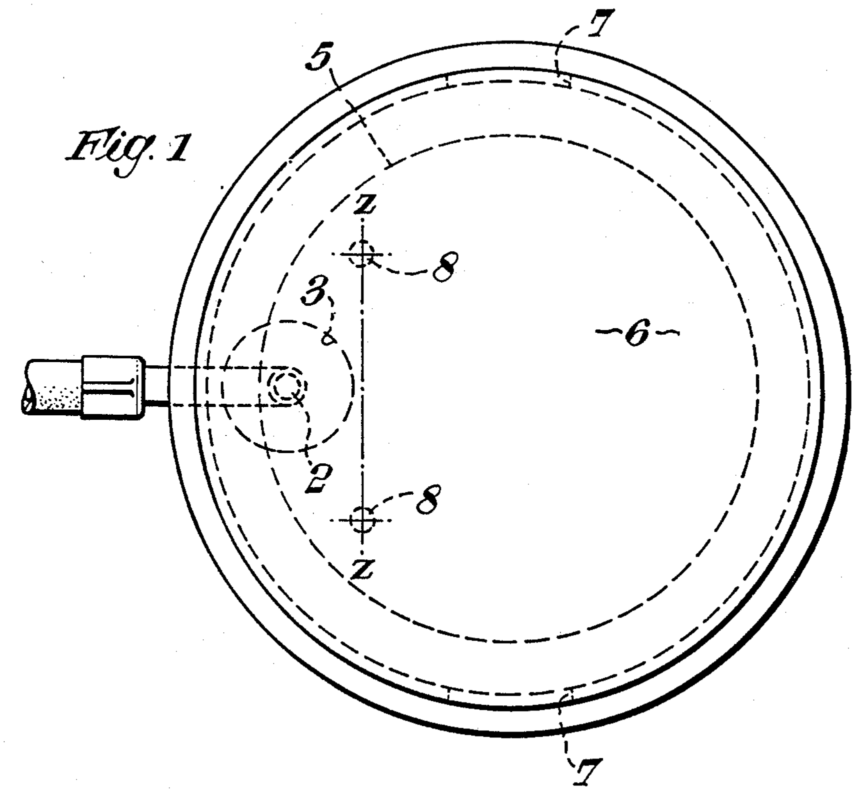
FIGS. 1, 2 and 3 show a first embodiment of a pressure regulator of the invention respectively in plan view and in sectioned elevation in its closed and open states.
Figure 2:
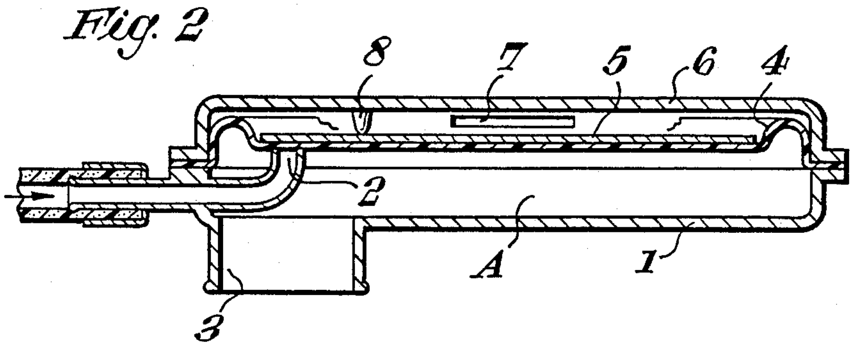
Figure 3:
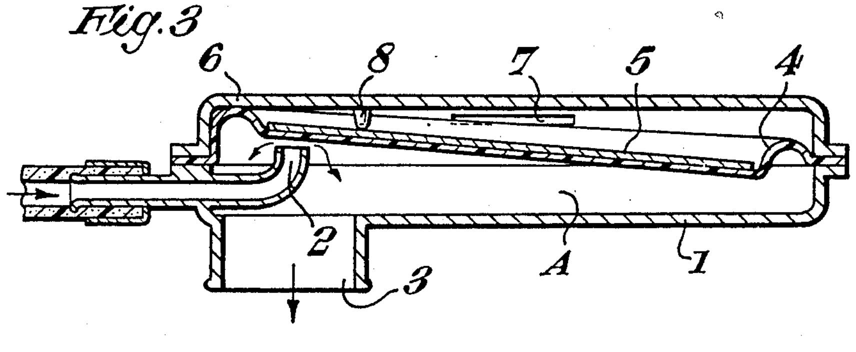

Referring now to FIGS. 1 to 3, the pressure regulator is adapted for use as a demand valve and comprises a housing 1 which defines a chamber A incorporating a gas inlet port 2 and an outlet port 3 for connection to a facepiece. The chamber A is sealed by a diaphragm A of flexible and resilient material, such as rubber or synthetic plastics material, which has the greater part of its area supported by a rigid backing plate 5. A diaphragm cover 6 is clamped to the housing by means of screws or a suitable clip arrangement (not shown), such that the diaphragm is secured in a leak-tight manner around its periphery. The cover is vented to atmosphere by means of one or more ports 7 and has, projecting inwardly towards the diaphragm, two fulcrum points 8 which contact the diaphragm to define an axis about which the diaphragm may tilt.

The relative dispositions of the inlet port 2 and the fulcrum points 8 with respect to the diaphragm centre are clearly shown in FIG. 1 and it may be seen that the greater part of the diaphragm area lies to one side of the fulcrum axis z-z whilst the inlet port 2 lies to the other side.

In practice, the arrangement may be likened to a simple beam balance in which the diaphragm plate represents the beam, pivoting about the fulcrum points according to the moments applied on the one hand by pressure at the inlet port and on the other hand by pressure within the chamber A. When the pressure in the chamber A exerts a moment greater than that of the inlet port pressure the diaphragm will close the inlet port. Thus it may be seen that without pressure in the housing the valve cannot close.

For a clearer understanding, there follows a description of the way in which the valve operates in practice.

When gas, at a substantially constant supply pressure, is admitted to the inlet port 2 the resultant force applied locally to the diaphragm 4 pushes the diaphragm away from the port by tilting it on the fulcrum points 8 in the cover 6 and gas can freely escape from the port into the chamber A as shown in FIG. 3. The outlet port 3 allows the incoming gas to pass freely from the housing to a facepiece. A spring-loaded exhalation valve in the facepiece prevents free escape of the gas to atmosphere, causing pressure to rise in the facepiece and consequently in the chamber A. The resultant force acting on the greater part of the diaphragm area urges the diaphragm to rotate anticlockwise as seen in FIGS. 2 and 3 to a position where the resilient material of the diaphragm 4 seats against the inlet port 2 and the supply of gas is closed off.

Thus it may be seen that the diaphragm, tilting upon the fulcrum points, regulates flow from the inlet port according to pressure in the chamber A.

For any given supply pressure, the proportions of the inlet port and diaphragm, and the relative positions of the fulcrum axis z-z and the inlet port 2 with respect to the diaphragm centre, may be arranged so as to achieve closing of the valve at virtually any desired pressure within chamber A. This closing pressure will always be greater than ambient pressure and this excess might, for example, be of the order of 2 millibars, whilst the exhalation valve on the facepiece might conveniently be arranged to open at an excess pressure of 4 millibars so that the superatmospheric pressure in the facepiece will automatically be maintained at a level between these two figures. On inhalation, pressure in the facepiece will fall slightly, causing the demand valve to open, admitting gas to restore the closing pressure. On exhalation, pressure in the facepiece will rise, causing the exhalation valve to open, allowing the exhaled breath to escape to atmosphere.

Although not shown, a baffle or deflector arrangement may be provided within the housing in order to guide gas flow out of the housing in such a manner as to improve the characteristics of the valve, for example by preventing turbulence or by creating an injector effect to help sustain flow.

In order to allow for some adjustment of the closing pressure, or to compensate for different supply pressures, provision may be made for adjusting the positions of the inlet port or the fulcrum points if required, and one or more springs acting on the diaphragm may be employed to alter the biasing conditions.

For certain applications, the cover 6 may be vented not to atmosphere but to some other reference pressure and, if required, the two fulcrum points 8 may be replaced with a single ridge without affecting the principle of operation. Manual override means, such as an aperture in cover 6 to allow manual tilting of the diaphragm from its closed position, may also be provided.

The advantages of this first embodiment of the invention over other known demand valves lie in its extremely simple and reliable construction, requiring virtually no maintenance and no adjustment. It is frictionless and free from backlash and, having only one moving part, the response can be very fast due to the low moving mass. Further, when the valve is in use, continual contact between the diaphragm and the fulcrum points and the tilting motion of the diaphragm allow a smoother operation and less susceptibility to vibration than known valves in which the diaphragm moves with a piston-like motion. The valve may be further protected from the effects of external vibration or acceleration by counterweighting the diaphragm plate 5 so as to obtain a balanced mass on either side of the fulcrum axis.

As the resilient material of the diaphragm itself is used as the valve seating, the diaphragm may be rotated slightly to present a new surface to the inlet port, should wear occur. The absence of any load between the diaphragm and the inlet port when the valve is not in use prevents any permanent deformation of the resilient material.

A further advantage is that, should supply pressure rise due, say, to pressure regulator malfunction, the valve will tend to open, venting the excess gas into the facepiece and hence to atmosphere, thus acting as a relief valve.

Figure 4:
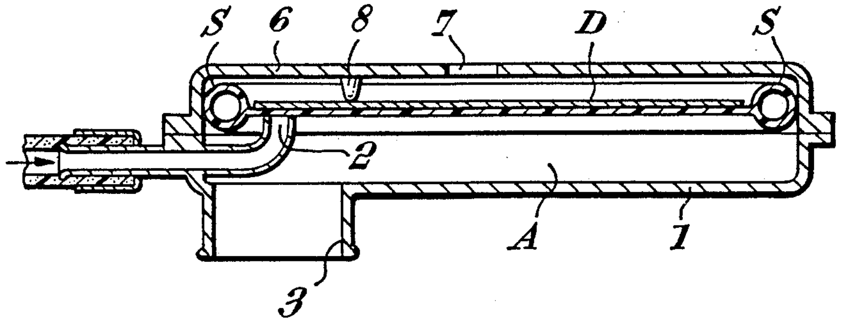
FIG. 4 shows a pressure regulator similar to that of FIGS. 1 to 3, with the flexible diaphragm replaced by a tilting piston.

In a second alternative embodiment illustrated in FIG. 4, the diaphragm 4 may be replaced by a piston comprising a central rigid disc D and a peripheral sealing element S. The disc D will, in operation, pivot about the pivot axis defined by projections 8 to occlude the inlet port when the pressure within the first chamber reaches the required level above that in the second chamber. The operation of the regulator is in all other respects as described above.

Figure 5:
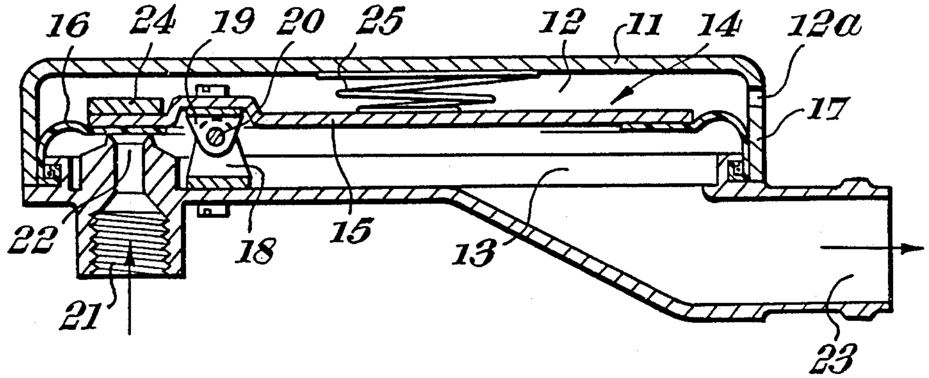
FIG. 5 shows a third embodiment of the invention in sectional elevation, wherein the pivoting diaphragm is secured by a pivot pin.

Referring now to FIG. 5, a third embodiment of a demand valve is shown comprising a hollow circular housing 11 divided into first and second chambers 12, 13 by a diaphragm 14. The first chamber is vented to the atmosphere by vent opening 12*a*.

Diaphragm 14 has a substantially rigid central portion 15 and a flexible peripheral portion 16 extending between the central portion 15 and the side wall 17 of the housing 11.

A bracket 18 is attached to the housing 11, and extends in the second chamber towards the diaphragm 14, the bracket 18 being pivotally attached to a second bracket 19 by a pivot pin 20. The second bracket 19 is fixed to the central portion 15 of the diaphragm 14, so that the pivot axis defined by pivot pin 20 is eccentric in relation to the central portion 15 of the diaphragm.

An inlet duct 21 extends paraxially into the housing 11, to terminate in an inlet port 22 adjacent the plane of the diaphragm 14. The inlet port 22 is closed by the diaphragm 14 when in the position shown, a part of the resilient material 16 of the diaphragm forming a seal over the inlet port.

The operation of the valve is identical to the manner of operation described in relation to the embodiments of FIGS. 1 to 3.

An advantage of the second embodiment is that, by providing a fixed pivot axis for the diaphragm, movement of the diaphragm is limited to rotation about one axis only. The effect of linear accelerations may be eliminated if the centre of mass of the diaphragm can be arranged to lie on the pivot axis by the provision of counterweights such as 24.

A spring 25, acting on the diaphragm, may be provided to adjust the pressure difference required to close the valve.

Figure 6:
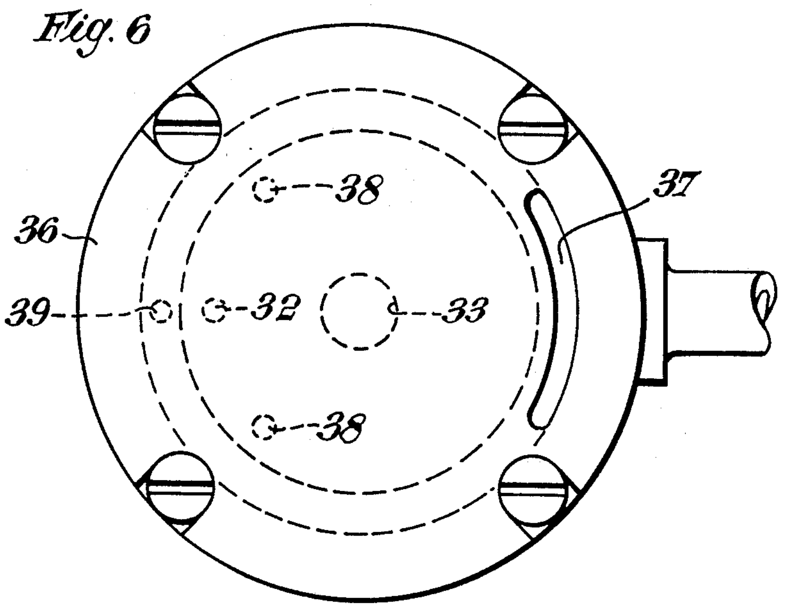
FIG. 6 illustrates, in plan view, a fourth embodiment of the invention wherein a tilting diaphragm valve operates as a pilot valve.
Figure 7:
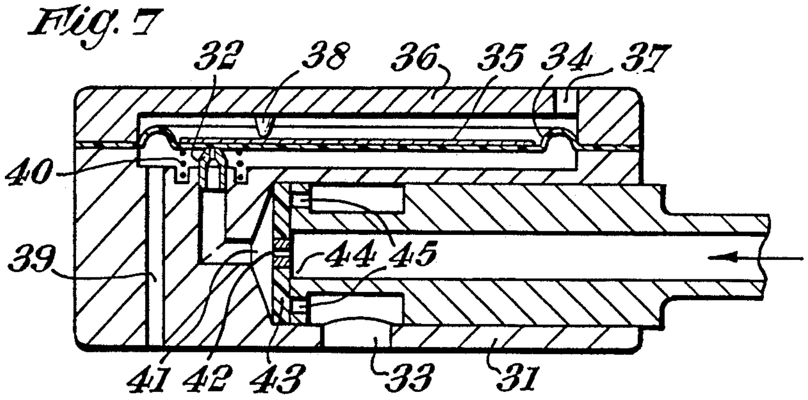
FIG. 7 shows the pressure regulator of FIG. 6 in sectional elevation in its closed state.
Figure 8:
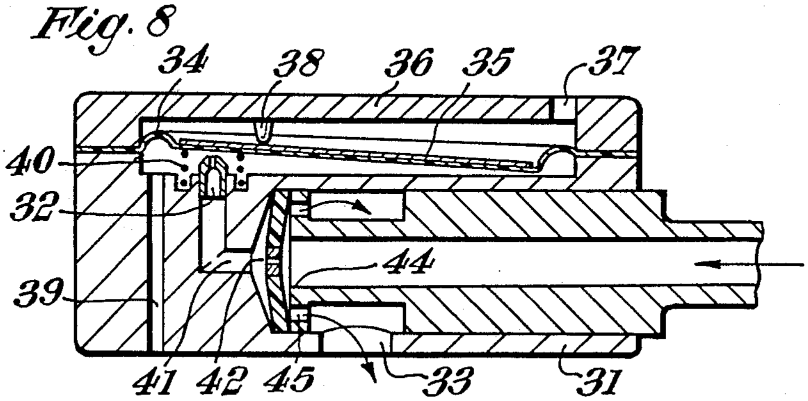
FIG. 8 shows the pressure regulator of FIGS. 6 and 7 in sectional elevation in its open state.

In a fourth embodiment of the invention shown in FIGS. 6, 7 and 8, there is provided a demand valve of much reduced proportions, wherein a diaphragm arrangement substantially as described in relation to FIGS. 1 to 3 regulates the flow of gas from a small pilot jet which in turn regulates the flow of gas from a larger jet to a facepiece.

The demand valve comprises a housing 31 which incorporates a pilot jet 32 and an outlet port 33 for connection to a facepiece. A diaphragm 34 of flexible and resilient material, supported over the greater part of its area by a rigid backing plate 35, is clamped in a leak-tight manner to the housing by a cover 36 secured to the housing by means of screws or a suitable clip arrangement. The cover is vented to atmosphere by one or more ports 37 and bears two internal projections 38 which act as fulcrum points about which the diaphragm can tilt. A port 39 connects the area under the diaphragm to a facepiece, by which means pressure in the facepiece is transmitted to the diaphragm 34 and the small flow of gas from the pilot jet 32 is freely allowed to escape to the facepiece when the pilot jet 32 is open.

If the force applied to the diaphragm by gas pressure at the small pilot jet 32 is not sufficient to bias the diaphragm adequately, then one or more springs 40 concentric with or adjacent to the pilot jet may be used to establish the required closing pressure of the valve.

Movement of the diaphragm 34 towards or away from the pilot jet 32, in response to pressure changes within the facepiece, regulates the escape of gas from a control pressure chamber 41 respectively raising or lowering the pressure in said chamber. This control pressure results from a small flow of gas into the chamber 41 through a metering orifice 42 in a resilient disc 43. The relative proportions of the metering orifice 42 and the pilot jet 32 are so arranged that when the diaphragm 34 is almost touching the pilot jet there will be sufficient pressure in the control chamber 41 to force the resilient disc 43 against the face of the main jet 44 obstructing a plurality of ports 45 in said face such that escape of gas from the main jet 44 to the outlet 33 is prevented.

Movement of the diaphragm away from the pilot jet 32 will cause pressure in the control pressure chamber 41 to fall, such that the resilient disc will bow away from the face of the main jet 44 under the influence of gas supply pressure, whereupon gas can escape through the ports 45 thus uncovered and pass to the facepiece via the outlet port 33 as indicated in FIG. 8.

This second embodiment of the invention retains the advantage of the first embodiment with the additional merit of notably smaller proportions and consequently lower diaphragm mass. It is also virtually unaffected by quite wide variations in supply pressure and, if required, the closing pressure may be readily changed by altering the biasing spring 40.

While the valve has been described principally as a demand valve for breathable gas, it should be understood that the valve may be used with other fluids in other applications than as a demand valve.

I claim:

1. A pressure regulator having an inlet for high pressure gas and an outlet, the regulator comprising a housing defining first and second chambers separated by a movable partition, the first chamber being vented to a reference pressure and the housing including fulcrum means to define an eccentric pivot axis for a rigid central part of the partition, the second chamber including a pilot jet facing the partition and closeable thereby at a position on the side of the pivot axis remote from the centroid of the rigid portion of the partition and a vent leading from the second chamber for fluid communication with the outlet of the pressure regulator, the housing further defining a third chamber communicating with the pilot jet and partially defined by a valve member adapted for movement between an open position and a closed position, to respectively allow or deny access from a high pressure supply port to the outlet of the pressure regulator, the high pressure being supplied to the third chamber via an orifice such that while a predetermined back pressure is applied to the outlet the rigid portion of the partition is held in a position to close the pilot jet and the valve member is held in its closed position by the pressure in the third chamber, and that when the back pressure is reduced to below a predetermined value the pilot jet is opened, the pressure in the third chamber reduces, and the valve member moves toward its open position.

2. A pressure regulator according to claim 1, wherein the partition comprises a diaphragm having a rigid central portion and a flexible periphery.

3. A pressure regulator according to claim 1, wherein the partition is a tilting piston having a rigid central part and a resilient sealing element about its periphery.

4. A pressure regulator according to claim 1, wherein the fulcrum means comprises a number of projections extending across the first chamber to contact the central portion of the partition along a line extending between its centroid and the position of the pilot jet.

5. A pressure regulator according to claim 1, wherein the valve member is a resilient element which is unstressed in its closed position and is resiliently deformed in its open position.

6. A pressure regulator according to claim 5, wherein the valve member is a resilient disc secured in the housing about its periphery, the high pressure supply port being arranged opposite a central area of the disc and the outlet being in communication with a number of openings spaced about the supply port and facing the disc, the supply port and the openings being occluded by the disc in its closed position.

7. A pressure regulator according to claim 1, wherein the orifice connecting the third chamber to the high pressure supply port comprises a passage of small diameter passing through the valve member.

8. A pressure regulator according to claim 1, wherein a resilient element biases the partition towards a position in which the pilot jet is unobstructed.

9. A pressure regulator having an inlet for high pressure gas and an outlet, said regulator comprising a housing defining first and second chambers separated by a movable partition, wherein said movable partition comprises a rigid central portion, passage means for permitting communication between said first chamber and a reference pressure, said housing carrying pivot means for operative engagement with said movable partition as to thereby establish a pivot axis about which said movable partition may rotate, wherein said pivot axis is located as to define an axis for pivotal rotation which is situated eccentrically of a mid-portion of the rigid central portion of said movable partition, the second chamber including a pilot jet facing the partition and closeable thereby at a position on the side of the pivot axis remote from the centroid of the rigid portion of the partition and a vent leading from the second chamber for fluid communication with the outlet of the pressure regulator, the housing further defining a third chamber communicating with the pilot jet and partially defined by a valve member adapted for movement between an open position and a closed position, to respectively allow or deny access from a high pressure supply port to the outlet of the pressure regulator, the high pressure being supplied to the third chamber via an orifice such that while a predetermined back pressure is applied to the outlet the rigid portion of the partition is held in a position to close the pilot jet and the valve member is held in its closed position by the pressure in the third chamber, and that when the back pressure is reduced to below a predetermined value the pilot jet is opened, the pressure in the third chamber reduces, and the valve member moves towards its open position.

* * * * *